(12) United States Patent
Luo et al.

(10) Patent No.: US 10,901,630 B2
(45) Date of Patent: Jan. 26, 2021

(54) METHOD AND APPARATUS FOR DETERMINING DATA DUPLICATION PROGRESS IN REAL-TIME

(71) Applicant: EMC IP Holding Company LLC, Hopkinton, MA (US)

(72) Inventors: Yuan Luo, Shanghai (CN); Ning Xu, Shanghai (CN); Frank Yuanyang Wu, Shanghai (CN); Qiu Shang, Shanghai (CN); Mark Yue Qian, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/954,649

(22) Filed: Apr. 17, 2018

(65) Prior Publication Data

US 2018/0300070 A1  Oct. 18, 2018

(30) Foreign Application Priority Data

Apr. 17, 2017  (CN) .......................... 2017 1 0248847

(51) Int. Cl.
*G06F 3/06* (2006.01)
*G06F 11/34* (2006.01)

(52) U.S. Cl.
CPC .......... *G06F 3/0619* (2013.01); *G06F 3/0605* (2013.01); *G06F 3/065* (2013.01); *G06F 3/067* (2013.01); *G06F 3/0653* (2013.01); *G06F 11/34* (2013.01)

(58) Field of Classification Search
USPC ....................................................... 707/667
See application file for complete search history.

(56) References Cited

U.S. PATENT DOCUMENTS

| | | | | |
|---|---|---|---|---|
| 7,287,043 | B2 * | 10/2007 | Lindsay | G06F 16/273 |
| 8,554,721 | B2 * | 10/2013 | Engel | G06F 3/0486 |
| | | | | 707/609 |
| 9,377,964 | B2 * | 6/2016 | Sharma | G06F 3/065 |
| 9,542,275 | B2 * | 1/2017 | Damgar | G06F 11/3409 |
| 9,836,712 | B2 * | 12/2017 | Fong | G06Q 10/06 |
| 9,916,202 | B1 | 3/2018 | Seela et al. | |
| 10,318,166 | B1 * | 6/2019 | Tummala | G06F 3/067 |
| 10,635,560 | B2 | 4/2020 | Cherkalova et al. | |
| 2015/0032978 | A1 * | 1/2015 | Bashyam | G06F 16/1752 |
| | | | | 711/162 |

(Continued)

*Primary Examiner* — Cam Linh T Nguyen
(74) *Attorney, Agent, or Firm* — BainwoodHuang (57) ABSTRACT

To monitor data duplication progress, embodiments of the present disclosure relate to a method and apparatus for determining data duplication progress in real-time. The method comprises initiating a duplication of data from a source system to a destination system. The method further comprises determining first duplication progress for an initial stage of the duplication, original data existing on the source system when the duplication is initiated being duplicated in the initial stage. Furthermore, the method further comprises determining, independently from the initial stage, second duplication progress for a delta stage of the duplication, delta data being duplicated in the delta stage and including at least data generated during the initial stage. The present disclosure develops a fine-grained monitoring mechanism of data duplication progress.

20 Claims, 5 Drawing Sheets

(56) References Cited

U.S. PATENT DOCUMENTS

2015/0066857 A1* 3/2015 Dayal .................. G06F 16/128
707/639
2016/0065670 A1* 3/2016 Kimmel ................ G06F 3/067
709/219
2019/0332309 A1 10/2019 Feng et al.

* cited by examiner

METHOD AND APPARATUS FOR DETERMINING DATA DUPLICATION PROGRESS IN REAL-TIME

RELATED APPLICATIONS

This application claim priority from Chinese Patent Application Number CN201710248847.5, filed on Apr. 17, 2017 at the State Intellectual Property Office, China, titled "METHOD AND DEVICE FOR DETERMINING DATA COPY PROGRESS IN REAL-TIME" the contents of which is herein incorporated by reference in its entirety.

FIELD

Embodiments of the present disclosure generally relate to monitoring of data duplication, and more specifically, to a method and apparatus for determining data duplication progress in real-time.

BACKGROUND

It is necessary to manage data duplication (also referred to as "data migration" and "data movement" herein) for a NAS (Network Attached Storage) server in an entity. For example, all the UFS32 (32-bit file systems) mounted on a source NAS server are duplicated to UFS64 (64-bit file systems) mounted on a destination NAS server. Server-level data duplication generally takes as long as several days to transfer data from the source side to the target side. During a data duplication, a user has a need to monitor the live progress of server data duplication. Thus a user with an older file server can copy their data to a new file server with minimum disruption. Meanwhile, the user needs to know how long it has taken and will take. However, there is currently still no method for determining the data duplication progress in real-time. Besides, there is no method for determining NAS-server-level duplication progress in real-time.

One problem of determining server data duplication progress in real-time is that the duplication engine is copying data meanwhile the client access is also changing data items on the storage. The system needs to identify automatically data changed due to copying, instead of data changed owing to client access or other on-demand requests. Hence, how to calculate live progress of data duplication reasonably has become a challenge.

SUMMARY

To solve the above and other potential problems at least in part, embodiments of the present disclosure provide a method and apparatus for determining data duplication progress in real-time.

According to a first aspect of the present disclosure, there is provided a method of determining data duplication progress in real-time. The method comprises initiating a duplication of data from a source system to a destination system. The method further comprises determining first duplication progress for an initial stage of the duplication, original data existing on the source system when the duplication is initiated being duplicated in the initial stage. Furthermore, the method further comprises determining, independently from the initial stage, second duplication progress for a delta stage of the duplication, delta data being duplicated in the delta stage and including at least data generated during the initial stage.

According to a second aspect of the present disclosure, there is provided a device for determining data duplication progress in real-time. The device comprises at least one processing unit and at least one memory coupled to the at least one processing unit and storing instructions executable by the at least one processing unit. The instructions, when executed by the at least one processing unit, cause the device to perform acts including: initiating a duplication of data from a source system to a destination system; determining first duplication progress for an initial stage of the duplication, original data existing on the source system when the duplication is initiated being duplicated in the initial stage; and determining, independently from the initial stage, second duplication progress for a delta stage of the duplication, delta data being duplicated in the delta stage and including at least data generated during the initial stage.

According to a third aspect of the present disclosure, there is provided a computer program product being tangibly stored on a non-transient computer readable medium and comprising machine executable instructions which, when executed, cause a machine to perform any steps of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTIONS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

The term "duplicating/copying" used herein can be utilized interchangeably with "migrating" and "moving." Embodiments of the present disclosure are described based on a server and a file system only by way of example.

It generally takes a relative long time (for example, several days) to duplicate a file system mounted on a source NAS server to a file system mounted on a destination NAS server. During a data duplication, it is advantageous to present live duplication progress to a user. During the data duplication, the client access may change data items on the storage, making it difficult to determine data duplication progress accurately. An NAS server may contain tens of file systems, each performing independently a file system level duplication which is known as IMT (In-band Migration Toolkit) duplication session. Another problem to be solved by the present disclosure is to aggregate progress of a plurality of file system level duplication sessions, obtaining server level duplication progress. This problem of file duplication on the NAS server also exists in other devices and scenarios in which a mass of data need to be duplicated.

To solve the above and other potential problems at least in part, example embodiments of the present disclosure propose a mechanism for determining data duplication progress in real-time. The mechanism divides a data duplication into two stages and calculates data duplication progress respectively for the two stages, and meanwhile, takes the state of inodes (or index nodes) of the destination system into consideration, thereby achieving accurate calculation of data duplication progress.

Figure 1:
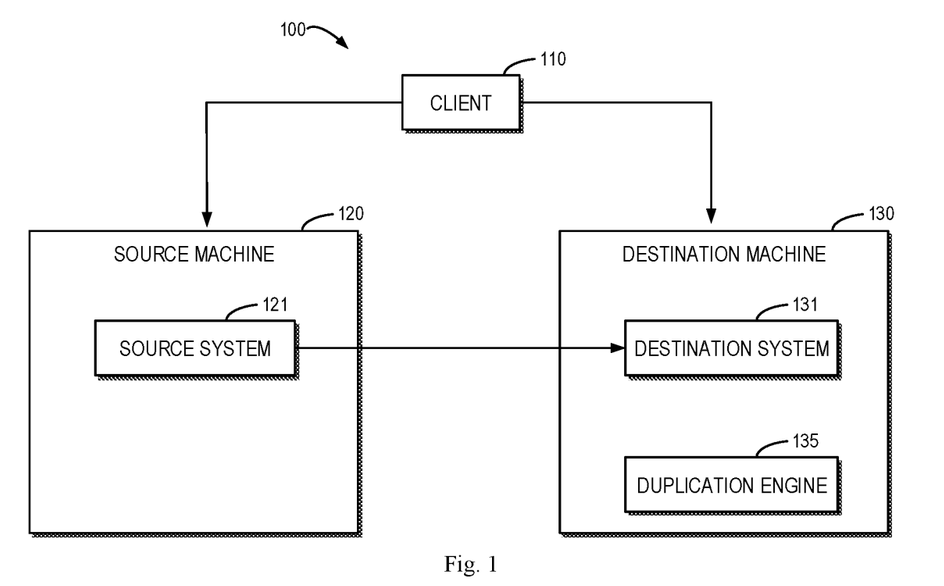
FIG. 1 illustrates a schematic diagram of an architecture for data duplication according to an embodiment of the present disclosure.

FIG. 1 illustrates a schematic diagram of an architecture 100 for data duplication according to an embodiment of the present disclosure. It should be appreciated that the structure and function of the architecture 100 are described only for illustrative purpose instead of implying any limit to the scope of the present disclosure. Embodiments of the present disclosure can be embodied in different structures and/or functions.

As shown in FIG. 1, the architecture 100 may include a client 110, a source machine 120 and a destination machine 130. A source system 121 is mounted on the source machine 120 and a destination system 131 is mounted on the destination machine 130. For example, the source machine 120 and the destination machine 130 may be a server. Specifically, the source machine 120 may be an older version of a file server and the destination machine 130 may be a newer version of a file server. The source system 121 and the destination system 131 may be a file system. The file system may include at least one inode that may include metadata.

For the purpose of server replacement, data of the source system 121 on the source machine 120 will be duplicated to the destination system 131 on the destination machine 130. The duplication may be implemented per inodes.

It is to be understood that any number of source systems may be mounted on the source machine 120, each source system being capable of performing a file system level duplication which is known as IMT (In-band Migration Toolkit) duplication session. A plurality of file system level duplications can be implemented simultaneously. During a data duplication, the client 110 may access the source machine 120 or the destination machine 130, thereby changing data of file systems.

The architecture 100 may further include a duplication engine 135 which is mounted on the destination machine 130 to control data duplication from the source system 121 to the destination system 131.

Figure 2:
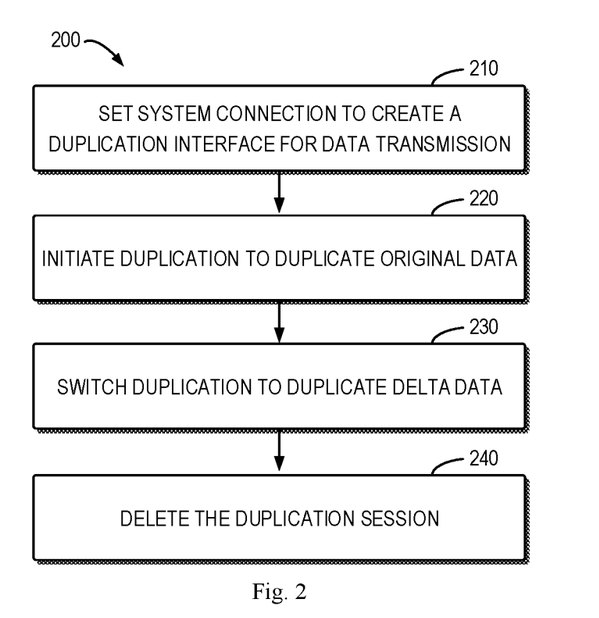
FIG. 2 illustrates a flowchart for a data duplication process according to an embodiment of the present disclosure.

FIG. 2 illustrates a flowchart for a data duplication process 200 according to an embodiment of the present disclosure. For example, the data duplication process 200 can be performed by the duplication engine 135 shown in FIG. 1. It should be appreciated that the data duplication process 200 may further include additional acts not shown and/or omit some acts as shown. The scope of the present disclosure is not limited in this regard.

The data duplication process 200 starts at 210 in which system connection is set to create a server level duplication session. Assuming that three source systems 121 are mounted on the source machine 120 shown in FIG. 1, then the server level duplication session can have three file system level duplication sessions implemented simultaneously. A duplication interface for data transmission may be created between the source machine 120 and the destination machine 130.

At 220, for a file system level duplication session, a data duplication is initiated to duplicate original data existing on the source system 121 when the duplication is initiated. This stage is referred to as an initial stage of the duplication.

At 230, for the file system level duplication session, the duplication is switched to duplicate delta data. The delta data here at least include data generated during the initial stage. This stage is referred to as a delta stage of the duplication.

At 240, the duplication engine 135 deletes the file system level duplication session.

In this way, the file system level duplication session is implemented in two stages: the initial stage and the delta stage. In the initial stage of the duplication, an IMT session will be created to duplicate original data existing on the source system 121 when the duplication is initiated into the destination system 131. In the delta stage of the duplication, the IMT session created in the initial stage will be removed and an IMT session for duplicating delta data will be created. Both stages are visible to a user and thus, it is advantageous to report individual progress percentages for both stages to the user.

Embodiments of the present disclosure are based on the following insights. The data duplication progress can be calculated based on the size of the duplicated file system or the number of inodes of the file system, both methods having drawbacks. For the method based on the size of the file system, the same size of the destination file system as the size of the source file system cannot be ensured. For example, a 32-bit file system has a different size from a 64-bit file system. In other words, at the end of the duplication, the size of the destination file system may be not equal to or not close to the size of the source file system, thereby causing inaccurate calculation of the data duplication progress. For the method based on the number of inodes, the time taken to duplicate different inodes may be different. For example, it takes longer duplication time for an inode with a large amount of data than an inode with a small amount of data. Therefore, a less vivid representation for duplication time would be caused by counting inodes of the source file system and the duplicated inodes of the destination file systems to calculate the data duplication progress. However, since the total number of inodes for the source side and the destination side is the same, it is more reasonable to calculate the data duplication progress based on the number of inodes. In the present disclosure, the method based on the number of inodes is utilized, while the state of inodes (a duplication successes or fails) is taken into account, and a fine-grained progress calculation solution is designed.

Figure 3:
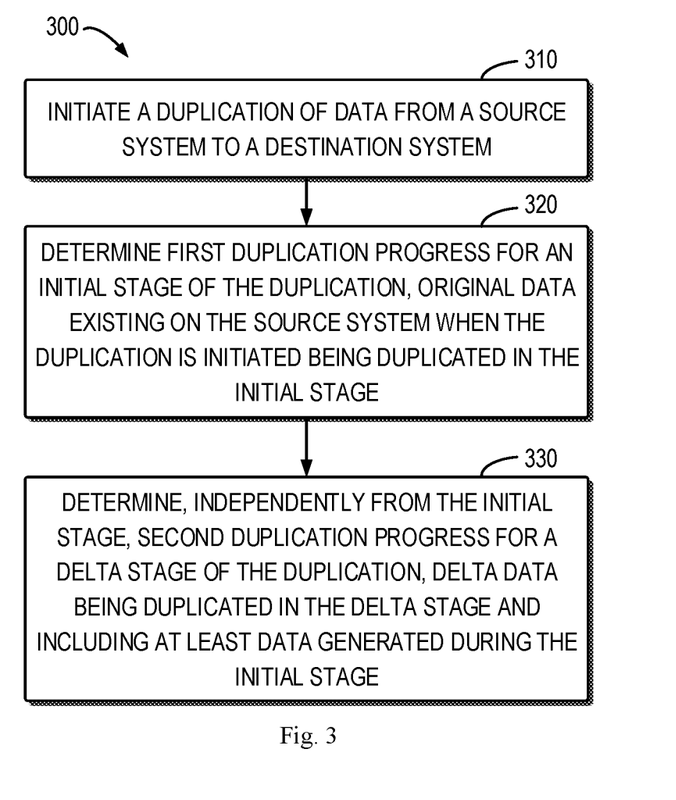
FIG. 3 illustrates a flowchart of a method of determining data duplication progress in real-time according to an embodiment of the present disclosure.

FIG. 3 illustrates a flowchart of a method 300 of determining data duplication progress in real-time according to an embodiment of the present disclosure. For example, the method 300 can be implemented by the duplication engine 135 shown in FIG. 1. It should be appreciated that the method 300 may further include additional acts not shown and/or omit some acts as shown. The scope of the present disclosure is not limited in this regard.

At 310, the duplication engine 135 initiates a duplication of data from the source system 121 to the destination system 131. As stated above, the duplication of data is divided into two stages: an initial stage and a delta stage.

Figure 4:
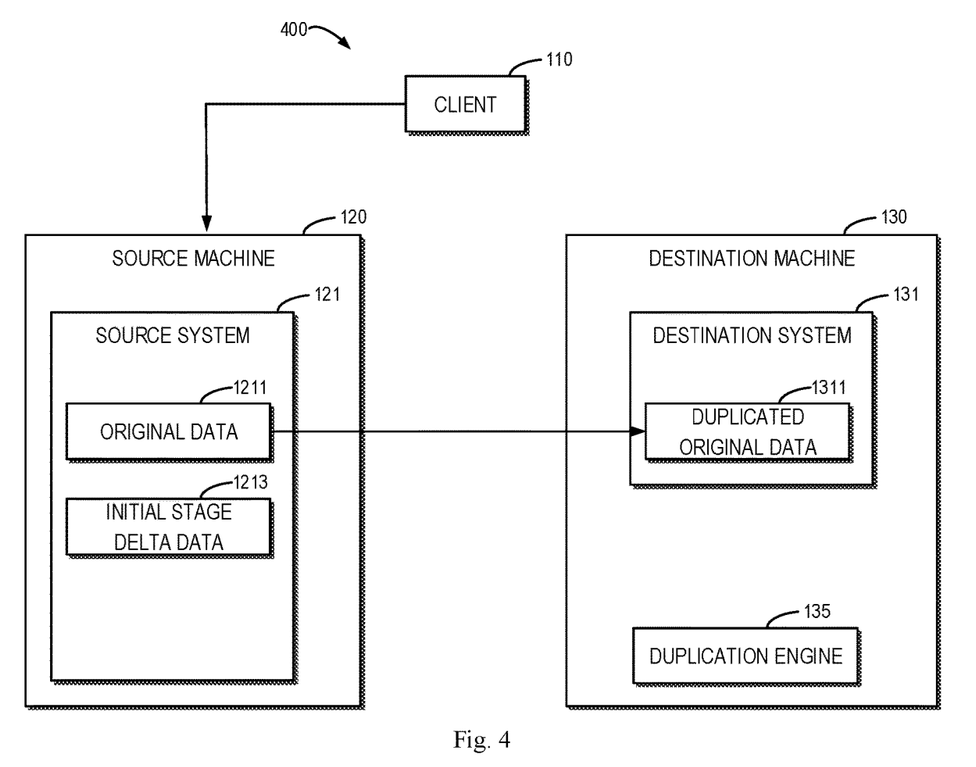
FIG. 4 illustrates a schematic diagram of an initial stage of a duplication according to an embodiment of the present disclosure.

FIG. 4 illustrates a schematic diagram of an initial stage 400 of a duplication according to an embodiment of the present disclosure. In the initial stage 400, original data 1211 existing on the source system 121 when the duplication is initiated are duplicated. For example, when the duplication is initiated, the duplication engine 135 scans data existing on the source system 121. The scanned data are the original data 1211 to be duplicated in the initial stage. In particular, as a modification to inodes which the scan cursor does not reach will be scanned, it will be considered as original data 1211. Conversely, as a modification to inodes which the scan cursor has traversed through will not be scanned, it will be considered as delta data.

The original data 1211 are duplicated to the destination system 131 as duplicated original data 1311. In the initial stage 400 of the duplication, the client 110 accesses the source machine 120, thereby generating initial stage delta data 1213 in the source system 121. The access by the client 110 can change data of a particular inode, add or delete an inode. For example, due to access by the client 110, the modification timestamp, size and so on of the inode may be changed. However, the initial stage delta data 1213 are not duplicated in the initial stage 400.

The IMT session for the initial stage 400 is completed until all the original data 1211 existing on the source system 121 when the duplication is initiated are duplicated to the destination side.

Referring back to FIG. 3, at 320, the duplication engine 135 determines first duplication progress for the initial stage of the duplication. In the initial stage, original data 1211 existing on the source system 121 when the duplication is initiated are duplicated. By only considering the original data 1211 in the initial stage, accuracy of calculation of the first duplication progress is ensured.

The initial stage 400 shown in FIG. 4 of the duplication does not involve the operation of a synchronizer. As data of the source system 121 may be changed by client access, in the initial stage 400, a first number of inodes to be duplicated needs to be stored in the beginning of the duplication session. Otherwise, if the state of the inodes of the source system 121 is queried in real-time on demand, at the end of the initial stage, the number of inodes of the destination system 131 will not necessarily be the same as the source side, and thus, an accurate value of the source side information cannot be obtained.

In response to the duplication being initiated, a first number of inodes of the source system 121 to be duplicated is stored. At a time t1 during the initial stage 400, a second number of inodes of the destination system 131 that have been duplicated is obtained. The duplication engine 135 can determine the first duplication progress at the time t1 based on the first and second numbers. By the first number being stored, the denominator for calculating the first duplication progress is fixed and immune from influence by client access, thereby ensuring accuracy of calculation.

For example, by utilizing FSSTAT (file system state) operation of NFS (network file system), the duplication engine 135 fetches the first number of inodes of the source system 121 when the duplication is initiated. The first number can be the number of inodes of the source system 121 scanned when the duplication is initiated. For the second number of inodes of the destination system 131 that have been duplicated, the duplication engine 135 can query getfsstat( ) of the application program interface.

As shown in FIG. 3, at 330 of the method 300, the duplication engine 135 determines, independently from the initial stage, second duplication progress for the delta stage of the duplication. Delta data are duplicated in the delta stage and include at least data generated during the initial stage.

Figure 5:
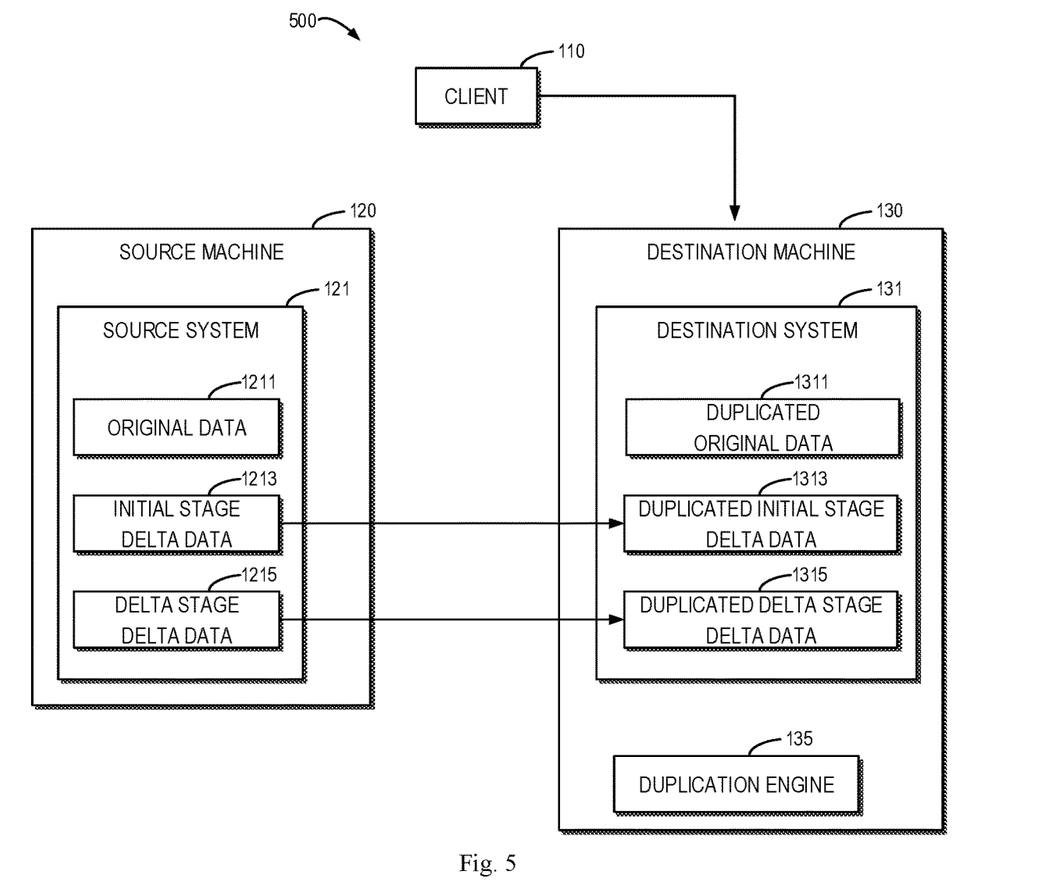
FIG. 5 illustrates a schematic diagram of a delta stage of a duplication according to an embodiment of the present disclosure.

FIG. 5 illustrates a schematic diagram of a delta stage 500 of a duplication according to an embodiment of the present disclosure. After duplication switch, each file system level duplication will delete the completed duplication session for the initial stage and create a duplication session for the delta stage. In the delta stage 500 of the duplication, the initial stage delta data 1213 accumulated during the initial stage of the duplication are duplicated into the duplicated initial stage delta data 1313 of the destination system 131. Moreover, the delta data may further include data (shown as delta stage delta data 1215 in FIG. 5) generated in the source system 121 as the client 110 accesses the destination system 131 during the delta stage 500. During the delta stage 500 of the duplication, the interface of the client 110 is turned up on the destination machine 130. In response to accessing the destination machine 130 by the client 110, the duplication engine 135 can build a transmission channel between the destination machine 130 and the source machine 120. The duplication engine 135 may include a synchronizer which firstly transmits accessed data generated by the client 110 to the source system 121 (as the delta stage delta data 1215) and then duplicates (also referred to as "synchronizes") the accessed data to the destination system 131 (as duplicated delta stage delta data 1315). In this way, accuracy and authority of data of the source system 121 can be ensured.

Thus, an improvement of embodiments of the present disclosure mainly comes from: analyzing the coexisting data types to be calculated and distinguishing which data portions are to be counted into duplication progress in a proper stage. Thereby a new algorithm handling complicated scenarios including the initial stage and the delta stage of the duplication is developed. As a result, the present disclosure achieves separate and precise measurement of duplication progress for the initial stage and the delta stage for the file system.

For the delta stage 500 of the duplication, calculation of the data duplication progress is more complicated because data of the destination system 131 in the delta stage do not only include the duplicated initial stage delta data 1313 but also the duplicated original data 1311 and the duplicated delta stage delta data 1315 (the three data portions may overlap with each other). Furthermore, data of the source system 121 also include three portions: the original data 1211, the initial stage delta data 1213 and the delta stage delta data 1215 which may also overlap with each other.

The original data 1211 are duplicated in the initial stage of the duplication. The initial stage delta data 1213 are data changed in the initial stage and duplicated in the delta stage of the duplication (the initial stage delta data 1213 can be non-zero in the beginning of the delta stage, including data generated by deletion/addition/modification). The duplicated initial stage delta data 1313 correspond to the initial stage delta data 1213 and can be zero in the beginning of the delta stage. The delta stage delta data 1215 are data changed in the delta stage (being zero in the beginning of the delta stage).

The duplication engine 135 may obtain a third number of changed inodes of the source system 121 compared with the original data 1211 at a time t2 during the delta stage 500. At the time t2, a fourth number of inodes in the destination system 131 that have been duplicated successfully in the delta stage is obtained. The duplication engine 135 may determine the second duplication progress at the time t2 based on the third and fourth numbers. By considering the state (for example, if the duplication succeeds or not) of inodes of the file system in determining the data duplication progress, a fine-grained mechanism for calculating live data duplication progress can be provided.

Moreover, by separately duplicating the original data (corresponding to the first duplication progress) existing on the source system when the duplication is initiated and delta data (corresponding to the second duplication progress) generated by client access during the duplication, the data duplication progress can be divided into two parts for calculation, thereby achieving accurate calculation of the data duplication progress. The duplication progress can be calculated more accurately, which facilitates the user better managing and planning a long-term duplication of server data.

Figure 6:
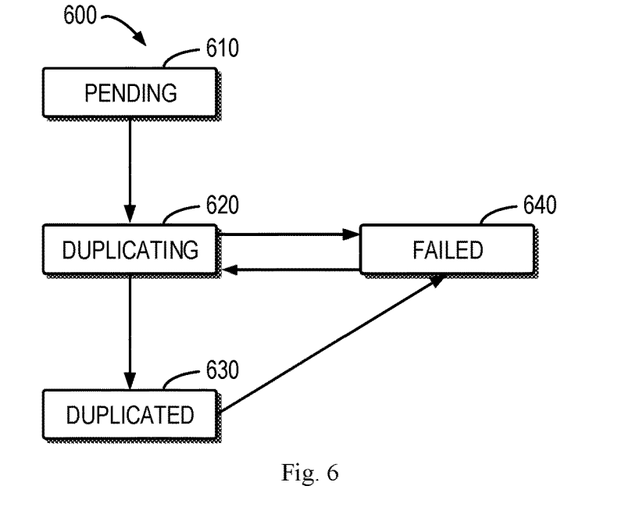
FIG. 6 illustrates a schematic diagram of a process for obtaining a fourth number of inodes in a destination system duplicated successfully in a delta stage according to an embodiment of the present disclosure.

FIG. 6 illustrates a schematic diagram of a process 600 for obtaining a fourth number of inodes in a destination system duplicated successfully in a delta stage according to an embodiment of the present disclosure. A state machine of the duplication engine 135 may be utilized to generate a metrics counter. The fourth number can be obtained with a counter. FIG. 6 shows four states of inodes of the destination system 131: "pending" state 610 which indicates that an inode has not yet been duplicated in the delta stage; "duplicating" state 620 which indicates that an inode is being duplicated in the delta stage; "duplicated" state 630 which indicates that the duplication of an inode in the delta stage has been finished; and "failed" state 640 which indicates that the duplication of an inode in the delta stage fails.

As shown in FIG. 6, in the delta stage, the duplication of an inode may fail. For example, a failure may occur for an inode in "duplicating" state 620 or "duplicated" state 630. If the duplication of an inode fails, the inode enter into "failed" state 640. For an inode in the destination system 131 that fails in the delta stage, the duplication engine 135 reduplicates a corresponding inode of the source system 121. Particularly, for an inode in the "failed" state 640, the duplication engine 135 reduplicates a corresponding inode of the source system 121 to the destination system 131. Therefore, if the counter only counts inodes which enter into "duplicating" state 620, when an inode in "failed" state 640 is reduplicated and enters into "duplicating" state 620 again, the counter would make repetitive counting, resulting in inaccurate calculation of the fourth number.

Considering the above case, according to an example, the fourth number is obtained by reducing the counting for inodes entering the "duplicating" state 620 again. It is possible to count inodes entering "failed" state 640. By subtracting the number of inodes in "failed" state 640 from the number of inodes in "duplicating" state 620, the fourth number of inodes in the destination system that have been duplicated successfully in the delta stage can be obtained. Alternatively, the inodes that have been duplicated successfully can be counted directly as the fourth number.

NAS server level duplication progress is calculated based on aggregation of file system level duplication progress. The source machine may include a plurality of file systems, where the source system is a first file system of the plurality of file systems on the source machine. The duplication engine 135 can determine duplication progress of the first file system based on the first duplication progress and the second duplication progress. Furthermore, the duplication engine 135 can determine duplication progress of data of the source machine based on the duplication progress of the first file system and duplication progress of data of other file systems of the plurality of file systems. For example, the duplication engine 135 can add the duplication progress of the plurality of file systems to obtain the duplication progress of the source machine, which achieves monitoring of the live NAS server duplication progress. The present disclosure merges file system level duplication progress into server level duplication progress. This is a comprehensive integrated solution providing both a fine-grained file system level data duplication and a server level data duplication.

Figure 7:
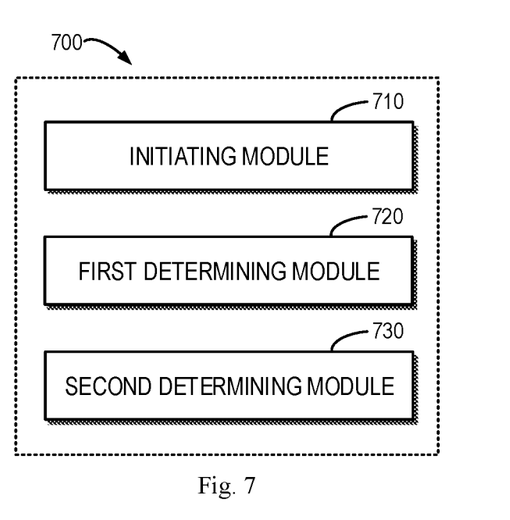
FIG. 7 illustrates a block diagram of an apparatus for determining data duplication progress in real-time according to an embodiment of the present disclosure.

FIG. 7 illustrates a block diagram of an apparatus 700 for determining data duplication progress in real-time according to an embodiment of the present disclosure. In some embodiments, the apparatus 700 can be, for example, implemented at the duplication engine 135. Alternatively, in some embodiments, the apparatus 700 can be implemented as the duplication engine 135 per se directly, namely, the duplication engine 135 can be implemented by the apparatus 700.

As shown in FIG. 7, the apparatus 700 may include an initiating module 710 which is configured to initiate a duplication of data from a source system to a destination system. The apparatus 700 may further include a first determining module 720 which is configured to determine first duplication progress for an initial stage of the duplication, wherein original data existing on the source system when the duplication is initiated are duplicated in the initial stage. Furthermore, the apparatus 700 may further include a second determining module 730 which is configured to determine, independently from the initial stage, second duplication progress for a delta stage of the duplication, wherein delta data are duplicated in the delta stage and include at least data generated during the initial stage.

In some embodiments, the first determining module 720 may include a storing sub-module which is configured to, in response to the duplication being initiated, store a first number of Modes of the source system to be duplicated. The first determining module 720 may further include a first obtaining sub-module which is configured to, at a time during the initial stage, obtain a second number of Modes of the destination system that have been duplicated. Furthermore, the first determining module 720 may further include a first determining sub-module which is configured to determine the first duplication progress at the time based on the first and second numbers.

In some embodiments, the second determining module 730 may include a second obtaining sub-module which is configured to, at a time during the delta stage, obtain a third number of changed inodes of the source system. The second determining module 730 may further include a third obtaining sub-module which is configured to, at the time, obtain a fourth number of inodes in the destination system that are duplicated successfully in the delta stage. Furthermore, the second determining module 730 may further include a second determining sub-module which is configured to determine the second duplication progress at the time based on the third and fourth numbers.

In some embodiments, the apparatus 700 may further include a reduplicating module which is configured to reduplicating a corresponding inode of the source system for an inode in the destination system that fails in the delta stage.

In some embodiments, the delta data may include data generated by accessing the source system by a client during the initial stage. In some embodiments, the delta data may further include data generated in the source system by accessing the destination system by a client during the delta stage.

In some embodiments, the source system is a first file system of a plurality of file systems on a source machine. The apparatus 700 may further include a third determining module which is configured to determine duplication progress of the first file system based on the first duplication progress and the second duplication progress. Furthermore, the apparatus 700 may further include a fourth determining module which is configured to determine duplication progress of data of the source machine based on the duplication progress of the first file system and duplication progress of data of other file systems of the plurality of file systems.

For the sake of clarity, some optional modules of the apparatus 700 are not shown in FIG. 7. However, it is to be understood that various features as described with reference to FIGS. 1-6 are likewise applicable to the apparatus 700. Furthermore, various modules of the apparatus 700 may be hardware modules or software modules. For example, in some embodiments, the apparatus 700 may be partially or completely implemented using software and/or firmware, e.g., implemented as a computer program product embodied on a computer readable medium. Alternatively or additionally, the apparatus 700 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this regard.

Figure 8:
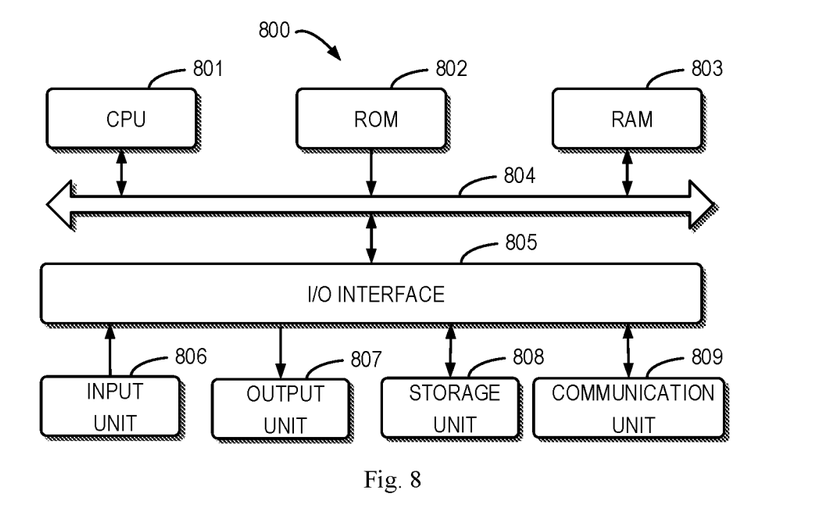
FIG. 8 illustrates a schematic block diagram of an example device that may be used to implement embodiments of the present disclosure.

FIG. 8 illustrates a schematic block diagram of an example device 800 that may be used to implement embodiments of the present disclosure. As shown in FIG. 8, the device 800 includes a central processing unit (CPU) 801, which can perform various appropriate actions and processes based on computer program instructions stored in a read-only memory (ROM) 802 or computer program instructions loaded from a storage unit 808 to a random access memory (RAM) 803. In RAM 803, there are also stored various programs and data required by the device 800 when operating. The CPU 801, ROM 802, and RAM 803 are connected to one another via a bus 804. An input/output (I/O) interface 805 is also connected to the bus 804.

A plurality of components of the device 800 are connected to the I/O interface 805, including: an input unit 806 comprising a keyboard, a mouse, and the like; an output unit 807, such as various types of displays, loudspeakers, and the like; a storage unit 808 including a magnetic disk, an optical disk, and the like; and a communication unit 809 including a LAN card, a modem, a wireless communication transceiver and so on. The communication unit 809 allows the device 800 to exchange information/data with other devices via a computer network, such as the Internet, and/or various telecommunications networks.

The above-described procedures and processes, such as the method 300, can be implemented by the processing unit 801. For example, in some embodiments, the method 300 can be implemented as a computer software program which is tangibly embodied on a machine readable medium, for instance, the storage unit 808. In some embodiments, part or all of the computer program can be loaded to and/or installed on the device 800 via the ROM 802 and/or the communication unit 809. The computer program, when loaded to the RAM 803 and executed by the CPU 801, may execute one or more acts of the method 300 as described above. Alternatively, the CPU 801 can also be configured to implement the method 300 as described above in any other proper manner (for example, by means of firmware).

As can be seen from the above depiction, an improvement is mainly derived from: analyzing the coexisting data types to be calculated and distinguishing which data portions are to be counted into duplication progress in a proper stage. The present disclosure achieves accurate measurement of duplication progress of the initial stage and the delta stage of the file system, thereby developing a new algorithm handling complicated scenarios comprising the initial stage and the delta stage of the duplication. The present disclosure develops a fine-grained monitoring mechanism of data duplication progress. The duplication progress can be calculated more accurately so that the user can better manage and plan a long-term server data duplication. Moreover, the present disclosure merges file system level duplication progress into server level duplication progress. This is a comprehensive integrated solution providing both a fine-grained file system level data duplication and a server level data duplication.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining data duplication progress in real-time, comprising:
   initiating a duplication of data from a source system to a destination system;
   determining first duplication progress for an initial stage of the duplication, original data existing on the source system when the duplication is initiated being duplicated in the initial stage; and
   determining, independently from the initial stage, second duplication progress for a delta stage of the duplication, delta data being duplicated in the delta stage and including at least data generated during the initial stage.

2. The method according to claim 1, wherein determining the first duplication progress comprises:
   in response to the duplication being initiated, storing a first number of inodes of the source system to be duplicated;

at a time during the initial stage, obtaining a second number of inodes of the destination system that have been duplicated; and determining the first duplication progress at the time based on the first and second numbers.

3. The method according to claim 1, wherein determining the second duplication progress comprises:

at a time during the delta stage, obtaining a third number of changed inodes of the source system;

at the time, obtaining a fourth number of inodes in the destination system that are duplicated successfully in the delta stage; and determining the second duplication progress at the time based on the third and fourth numbers.

4. The method according to claim 3, further comprising:

for an inode in the destination system that fails in the delta stage, reduplicating a corresponding inode of the source system.

5. The method according to claim 1, wherein the delta data include data generated by accessing the source system by a client during the initial stage.

6. The method according to claim 5, wherein the delta data further include data generated in the source system by accessing the destination system by a client during the delta stage.

7. The method according to claim 1, wherein the source system is a first file system of a plurality of file systems on a source machine, the method further comprising:

determining duplication progress of the first file system based on the first duplication progress and the second duplication progress; and determining duplication progress of data of the source machine based on the duplication progress of the first file system and duplication progress of data of other file systems of the plurality of file systems.

8. A device for determining data duplication progress in real-time, comprising:

at least one processing unit; and at least one memory coupled to the at least one processing unit and storing instructions executable by the at least one processing unit, the instructions, when executed by the at least one processing unit, causing the device to perform acts including:

initiating a duplication of data from a source system to a destination system;

determining first duplication progress for an initial stage of the duplication, original data existing on the source system when the duplication is initiated being duplicated in the initial stage; and determining, independently from the initial stage, second duplication progress for a delta stage of the duplication, delta data being duplicated in the delta stage and including at least data generated during the initial stage.

9. The device according to claim 8, wherein determining the first duplication progress comprises:

in response to the duplication being started, storing a first number of inodes of the source system to be duplicated;

at a time during the initial stage, obtaining a second number of inodes of the destination system that have been duplicated; and determining the first duplication progress at the time based on the first and second numbers.

10. The device according to claim 8, wherein determining the second duplication progress comprises:

at a time during the delta stage, obtaining a third number of changed inodes of the source system;

at the time, obtaining a fourth number of inodes in the destination system that are duplicated successfully in the delta stage; and determining the second duplication progress at the time based on the third and fourth numbers.

11. The device according to claim 10, wherein the acts further include:

for an inode in the destination system that fails in the delta stage, reduplicating a corresponding inode of the source system.

12. The device according to claim 8, wherein the delta data include data generated by accessing the source system by a client during the initial stage.

13. The device according to claim 12, wherein the delta data further include data generated in the source system by accessing the destination system by a client during the delta stage.

14. The device according to claim 8, wherein the source system is a first file system of a plurality of file systems on a source machine, the acts further including:

determining duplication progress of the first file system based on the first duplication progress and the second duplication progress; and determining duplication progress of data of the source machine based on the duplication progress of the first file system and duplication progress of data of other file systems of the plurality of file systems.

15. A computer program product for determining data duplication progress in real-time, the computer program product comprising:

a non-transitory computer readable medium encoded with computer-executable program code, the code configured to enable the execution of:

initiating a duplication of data from a source system to a destination system;

determining first duplication progress for an initial stage of the duplication, original data existing on the source system when the duplication is initiated being duplicated in the initial stage; and determining, independently from the initial stage, second duplication progress for a delta stage of the duplication, delta data being duplicated in the delta stage and including at least data generated during the initial stage.

16. The computer program product of claim 15, wherein determining the first duplication progress comprises:

in response to the duplication being initiated, storing a first number of inodes of the source system to be duplicated;

at a time during the initial stage, obtaining a second number of inodes of the destination system that have been duplicated; and determining the first duplication progress at the time based on the first and second numbers.

17. The computer program product of claim 15, wherein determining the second duplication progress comprises:

at a time during the delta stage, obtaining a third number of changed inodes of the source system;

at the time, obtaining a fourth number of inodes in the destination system that are duplicated successfully in the delta stage; and determining the second duplication progress at the time based on the third and fourth numbers.

18. The computer program product of claim 17, wherein the code is further configured to enable the execution of:

for an inode in the destination system that fails in the delta stage, reduplicating a corresponding inode of the source system.

19. The computer program product of claim 15, wherein the delta data include data generated by accessing the source system by a client during the initial stage.

20. The computer program product of claim 15, wherein the delta data further include data generated in the source system by accessing the destination system by a client during the delta stage.

* * * * *